(12) United States Patent
Scholz et al.

(10) Patent No.: US 9,780,569 B2
(45) Date of Patent: Oct. 3, 2017

(54) MODULAR DATA SYSTEM WITH INDUCTIVE ENERGY TRANSFER

(71) Applicant: Phoenix Contact GmbH & Co. KG, Blomberg (DE)

(72) Inventors: Peter-Dominik Scholz, Brakel (DE); Johannes Kalhoff, Blomberg (DE)

(73) Assignee: PHOENIX CONTACT GmbH & CO. KG, Blomberg (DE)

( * ) Notice: Subject to any disclaimer, the term of this patent is extended or adjusted under 35 U.S.C. 154(b) by 421 days.

(21) Appl. No.: 14/371,644

(22) PCT Filed: Jan. 11, 2013

(86) PCT No.: PCT/EP2013/050493
§ 371 (c)(1),
(2) Date: Jul. 10, 2014

(87) PCT Pub. No.: WO2013/104758
PCT Pub. Date: Jul. 18, 2013

(65) Prior Publication Data
US 2015/0008757 A1 Jan. 8, 2015

(30) Foreign Application Priority Data

Jan. 12, 2012 (DE) ........................ 10 2012 000 409

(51) Int. Cl.
*H01F 27/42* (2006.01)
*H01F 37/00* (2006.01)
(Continued)

(52) U.S. Cl.
CPC .............. *H02J 5/005* (2013.01); *H04B 5/005* (2013.01); *H04B 5/0031* (2013.01);
(Continued)

(58) Field of Classification Search
CPC .. H02J 5/005; H02J 7/025; H02J 17/00; H02J 50/12; H02J 50/10; H02J 50/80;
(Continued)

(56) References Cited

U.S. PATENT DOCUMENTS

| 6,803,744 B1 | 10/2004 | Sabo |
| 7,262,700 B2 | 8/2007 | Hsu |

(Continued)

FOREIGN PATENT DOCUMENTS

| CN | 101517666 A | 8/2009 |
| DE | 10039707 A1 | 3/2002 |

(Continued)

OTHER PUBLICATIONS

Jochen Helms, "Related International Application Number: PCT/EP2013/050494", "International Search Report", Jun. 19, 2013, Publisher: PCT, Published in: EP.

(Continued)

*Primary Examiner* — Jared Fureman
*Assistant Examiner* — Esayas Yeshaw
(74) *Attorney, Agent, or Firm* — Kaplan Breyer Schwarz, LLP

(57) ABSTRACT

A device for electrical energy supply and/or data supply of end devices using inductive coupling includes an oblong holding device and a number of adjacently arranged transmitting coils that generate magnetic field lines along the holding device. Structurally narrow end devices have flat receiving coils whose plane is oriented perpendicular to the longitudinal extension of the holding device.

11 Claims, 3 Drawing Sheets

(51) Int. Cl.
  *H01F 38/00* (2006.01)
  *H02J 5/00* (2016.01)
  *H04B 5/00* (2006.01)
  *H04L 12/10* (2006.01)
  *H04L 25/02* (2006.01)

(52) U.S. Cl.
  CPC ......... *H04B 5/0037* (2013.01); *H04B 5/0087* (2013.01); *H04B 5/0093* (2013.01); *H04L 12/10* (2013.01); *H04L 25/0266* (2013.01)

(58) Field of Classification Search
  CPC .. H02J 50/90; H02J 50/60; H02J 50/40; H02J 50/20; H02J 2007/0096; H02J 7/0042
  USPC .......................................................... 307/104
  See application file for complete search history.

(56) References Cited

U.S. PATENT DOCUMENTS

| | | | |
|---|---|---|---|
| 9,099,880 | B2 | 8/2015 | Wesemann et al. |
| 9,331,495 | B2 | 5/2016 | Soar |
| 2002/0021226 | A1 | 2/2002 | Clement et al. |
| 2003/0210106 | A1 | 11/2003 | Cheng et al. |
| 2005/0189945 | A1* | 9/2005 | Reiderman ............... G01V 3/28 324/333 |
| 2006/0165039 | A1 | 7/2006 | Lyon et al. |
| 2007/0019357 | A1* | 1/2007 | Keely ....................... H05C 1/06 361/232 |
| 2007/0033153 | A1* | 2/2007 | Yamanaka ............... G01V 1/008 706/21 |
| 2008/0179963 | A1 | 7/2008 | Fouquet et al. |
| 2009/0072629 | A1* | 3/2009 | Cook ........................ H02J 17/00 307/104 |
| 2010/0285747 | A1* | 11/2010 | Bauer ....................... H01F 38/14 455/41.1 |
| 2010/0314946 | A1 | 12/2010 | Budde et al. |
| 2010/0328044 | A1 | 12/2010 | Waffenschmidt et al. |
| 2011/0127845 | A1 | 6/2011 | Walley et al. |
| 2011/0181238 | A1 | 7/2011 | Soar |
| 2011/0255259 | A1* | 10/2011 | Weber .................. H04M 1/026 361/807 |
| 2012/0007437 | A1 | 1/2012 | Fells et al. |
| 2012/0032632 | A1 | 2/2012 | Soar |
| 2012/0049620 | A1* | 3/2012 | Jansen ................. B60C 23/041 307/9.1 |
| 2012/0104999 | A1* | 5/2012 | Teggatz .................. H01F 38/14 320/108 |
| 2012/0112552 | A1* | 5/2012 | Baarman ................ H05K 9/002 307/104 |
| 2012/0217111 | A1 | 8/2012 | Boys et al. |
| 2012/0313447 | A1* | 12/2012 | Park ......................... H02J 5/005 307/104 |
| 2013/0270921 | A1* | 10/2013 | Boys ....................... H01F 38/14 307/104 |
| 2014/0111147 | A1 | 4/2014 | Soar |
| 2014/0292101 | A1* | 10/2014 | Baarman ................ D06F 75/08 307/104 |
| 2015/0326028 | A1* | 11/2015 | Suzuki .................... H02J 5/005 307/104 |

FOREIGN PATENT DOCUMENTS

| | | |
|---|---|---|
| DE | 102007060811 A1 | 3/2009 |
| DE | 102007061610 B4 | 1/2010 |
| EP | 1885085 A1 | 2/2008 |
| EP | 2073315 A2 | 6/2009 |
| EP | 2067148 B1 | 6/2011 |
| WO | 9815069 A1 | 4/1998 |
| WO | 2008118178 A1 | 2/2008 |
| WO | 2008118178 A1 | 10/2008 |
| WO | 2010125048 A1 | 11/2011 |

OTHER PUBLICATIONS

"Office Action" issued in related Chinese Patent Application No: 201380005289.X, dated Jul. 2, 2015 Published in: CN.
"Related International Application No. PCT/EP2013/050494", "Translation of the International Preliminary Report on Patentability", Jul. 24, 2014, Publisher: PCT / IB of WIPO, Published in: CH.
"Related International Application No. PCT/EP2013/050493", "Translation of the International Preliminary Report on Patentability", Jul. 24, 2014, Publisher: PCT / IB of WIPO, Published in: CH.
Officer: Satu Tschubel, "Related International Patent Application No. PCT/EP2013/050493", "International Search Report and Written Opinion", Mar. 26, 2013, Publisher: PCT, Published in: EP.
"German Office Action", issued in related application No. 10 2012 000 408.7 dated Nov. 21, 2012.
"German Office Action", issued in related application No. 10 2012 000 409.5 dated Nov. 21, 2012.
"Office Action" dated Oct. 6, 2016 in related U.S. Appl. No. 14/371,622.
"Notice of Allowance and Fee(s) Due", U.S. Appl. No. 14/371,622, dated May 19, 2017, 8 pages.

* cited by examiner

MODULAR DATA SYSTEM WITH INDUCTIVE ENERGY TRANSFER

FIELD OF THE INVENTION

The invention relates to a device for electrical energy supply and/or data supply of end devices using inductive coupling.

BACKGROUND OF THE INVENTION

The phenomenon of inductive coupling permits contactless energy transfer between a transmitting device and a receiving device and may be supplemented with primary coil and secondary coil to form a transformer. Examples of such systems are described in WO 98/15069 A1, EP 1 885 085 A1, DE 10 2007 060 811 A1, and DE 10 2007 061 610 B4. When the devices are coupled, a closed magnetic core is formed or only small air gaps in the core are permitted so that the contactless energy transmission is very efficient. However, this requires precise spatial positioning of primary coil relative to secondary coil, which sharply limits the freedom in spatial positioning for the primary transmitting device to the secondary transmitting device.

To be relieved of this limitation in spatial positioning, U.S. Pat. No. 7,262,700 B2 and US 2010/0328044 A1 suggest arranging on a desk surface of the transmitting device flat coils, as primary coils, that cooperate with secondary flat coils of the receiving device to supply the latter with power. The receiving device with the secondary coil is mobile and may be supplied with power at any position on the desk plate of the transmitting device, wherein the transmitting device scans for where the receiving device is located so that the primary coil is operated only there. The effective magnetic field lines between primary coil and secondary coil run perpendicular to the desk surface.

U.S. Pat. No. 6,803,744 B1 relates to an inductive energy transfer device for recharging the battery of cordless devices. Below the table surface, a table houses arrangements of primary coils that may be turned on via switches and that cooperate with secondary coils of the devices to be recharged. The devices to be recharged are a laptop computer and a cordless drill that obviously may be used for its intended purpose after recharging.

Known from EP 2 067 148 B1 is a transmitting device having a rail-like charging fixture for transferring electromagnetic energy to a plurality of electronic devices, and specifically a plurality of overlapping flat primary coils are provided along a rail of the transmitting device, which coils detect the presence of a receiving device by means of a sensor and selectively activate primary coils accordingly. The effective magnetic field lines between primary coil and secondary coil run perpendicular to the rail surface.

US 2003/0210106 A1 discloses a system of inductive coupling between a plate-like primary side of the transmitting device and a secondary side of the receiving device. The primary side has a flat winding in which the windings run in a helical or rectangular shape nested within one another to permit via a desk surface inductive coupling with the receiving device, whose position and orientation within an active area of the desk surface may be freely selected. The magnetic field lines run essentially parallel to the desk surface in this active area. The secondary side has a winding about a plate-like or cylindrical core.

Known from WO2010/125048 A1 is a system for supplying bus subscriber modules with contactless energy and data, which system includes within a hat-shaped carrier-rail a power supply rail that has an energy transfer interface and a data transfer interface and each of the bus subscriber modules has a corresponding energy transfer interface and a corresponding data transfer interface. The interfaces work based on spiral flat coils whose planes run parallel to one another so that the field lines extend vertical to the longitudinal extension of the carrier rail.

US 2002/0021226 A1 relates to an electrical apparatus having a monitoring device, support, and monitoring device for such an apparatus, and electrical installation incorporating them. A switchgear housing with support rails is provided for receiving electrical apparatus, each of which apparatus has a receiving coil. In a first configuration there are transmitting coils on the front sides of the switchgear housing in which two rails with attached apparatus extend, in a second configuration there is a transmitting coil parallel to two rails on which the electrical apparatus are arranged, and in a third configuration there are top hat rails, and a single flattened coil extends in the interior of each of these, thus supplying energy to a series of electrical apparatus placed on the top hat rails. It is not possible to allocate individual transmitting coils to individual receiving coils.

Electronic devices are often accommodated in switchgear cabinets and are frequently placed along retaining rails. Often a galvanic separation is required between the power supply and the user or end devices. Although such user or end devices are adapted to the retaining rail at their base, there are significant differences with respect to the longitudinal dimensioning of the rails. With narrow devices, the surface opposing the retaining rails is quite small so that inductive coupling between the power supply and the user or end device seems problematic.

SUMMARY OF THE INVENTION

The underlying object of the invention is to supply even narrow user or end devices lined up on a retaining device with electrical energy and/or with data in a contactless manner.

To this end the device for supplying electrical energy and/or data to end devices has an oblong holding device that permits end devices to be held lined up adjacent to one another. The holding device has a number of adjacently arranged transmitting coils whose dimension in the longitudinal direction of the holding device is matched to the dimension of the narrowest end device, seen in the longitudinal direction of the holding device. This dimension, called the width, is approximately the same as the width of structurally narrow end devices. Wider end devices may extend across the width of two or more transmitting coils. For generating magnetic field lines, the transmitting coils are embodied with a useable portion parallel to the longitudinal extension of the holding device and may be switched individually.

If power is to be supplied to the end devices in a contactless manner via the transmitting coils, they each have at least one receiving coil that detects the usable portion of the magnetic field lines extending parallel to the holding device and renders the end device usable.

The receiving coil of at least one end device spans a plane transverse to the usable portion of the field lines of the transmitting coils. Such a receiving coil may be characterized as a flat coil whose plane is perpendicular to the direction in which the holding device extends. Thus the receiving coil may be embodied extremely narrow and may be accommodated in each end device, even if the end device is exceptionally narrow.

It is also possible to accommodate two or more of the flat receiving coils in the end device, for instance because the electrical energy supply and the data supply are to be separated in the end device or because a plurality of galvanically separated equipment parts are to be supplied with energy.

With structurally narrow end devices, it is possible to appropriately act on associated individual transmitting coils and, with wider end devices, to interconnect individual transmitting coils to create transmitting coil groups in order attain a virtually longer coil.

Wider end devices must be provided with flat receiving coils, but do not have to be in order to detect the usable portion of the alternating magnetic field.

In order to generate magnetic field lines having an effective portion parallel to the longitudinal extension of the holding device, screw-like or helical windings may be provided for producing coils having a cylindrical cover and an associated coil axis parallel to the longitudinal extension of the holding device. The effective portion of the magnetic field lines runs outside of the coil cover on the side facing away from the holding devices. A similar course for the field results when the cylindrical coil cover is changed to a rectangular or elliptical structure.

The effective portion of the magnetic field lines, which runs parallel to the holding device, is detected by the at least one receiving coil, the windings of which run helically about an opening whose plane may be described by an axis that extends parallel to the longitudinal extension of the holding device.

For bundling the magnetic field lines, a coil core made of ferromagnetic or ferrimagnetic material may be employed that guides the field lines of the transmitting coil to the receiving coil. If positioning of the end device on the holding device is to be selected relatively freely and flexibly, an appropriately wide core gap is provided, or no coil cores are used at all so that the end devices may be positioned at any location along the holding device. However, coils with or without a coil core may be shielded against interfering metal bodies by means of ferromagnetic or ferrimagnetic materials.

BRIEF DESCRIPTION OF THE DRAWINGS

An exemplary embodiment of the invention shall be described using the drawings.

DETAILED DESCRIPTION

Figure 1:
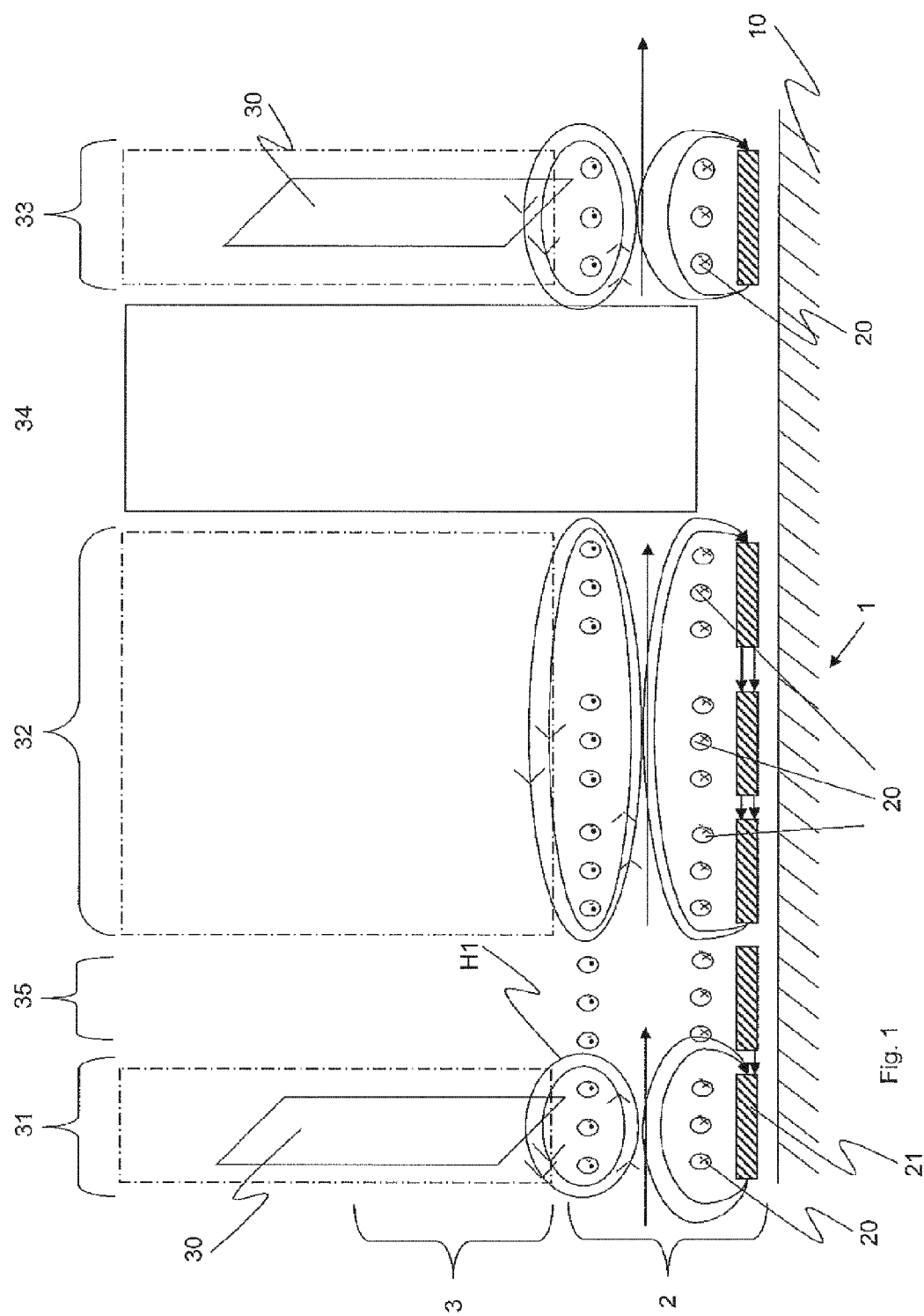
FIG. 1 is a longitudinal section through an electrical energy supply device.

The most important parts of the energy supply device are a holding device 1, a layer 2 of adjacently arranged transmitting coils 20, and a layer 3 of adjacently arranged end devices 31, 32, 33, 34. The holding device 1 includes a rail 10 onto which the end devices 31 through 34 may be latched in a row, also with a gap 35 therebetween. The positioning of the end devices along the rail is free or flexible and does not require any particular sequence.

The transmitting coils 20 are embodied in a screw shape or are helical with a cylindrical cover and an axis that extends parallel to the longitudinal extension of the holding device 1. Rectangular or elliptical screws may also be used. All such coil shapes are helical coils. In the exemplary embodiment depicted, six transmitting coils 20 are provided that may be turned on and off individually. Their power supply lines are attached to the holding device 1 or pass therethrough, but are not shown. When the transmitting coils 20 are used for data signal transfer, the corresponding data lines are also provided. When the transmitting coils 20 may be switched individually, this means that they may also be interconnected in groups, as is shown for the end device 32. A discrete electronics unit may be allocated to each individual transmitting coil to be able to regulate parameters of power output per individual coil, including current phase, current amplitude, and current frequency. The electronics unit may also include a sensor that detects coupling effects with associated receiving coils to determine which end device is adjacent or whether an end device can even be activated via the specific transmitting coil (determines a gap in the row of end devices).

The transmitting coils are depicted without a core, but a non-closed core with an air gap could be present at the location at which one of the end devices is disposed. However, a ferrite structure 21 is usefully arranged to the side on the holding device 1 to prevent parasitic induction from the transmitting coils, which could interfere from sides of the holding device. In addition, eddy current losses are minimized in the possibly metal holding device.

Figure 2:
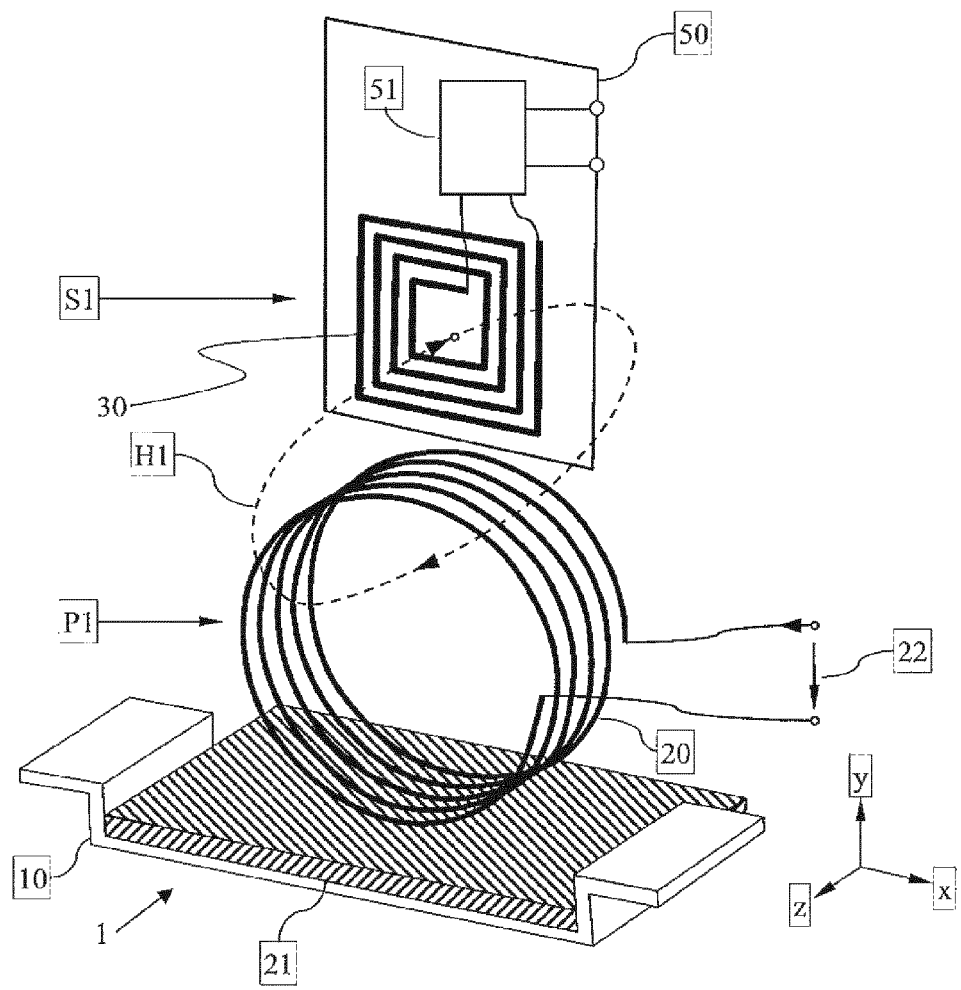
FIG. 2 is a perspective elevation of a detail.

At least some of the end devices house a flat coil 30 that works as a receiving coil with the closest transmitting coil 20. The windings of the flat receiving coil 30 run in a helical shape, wherein "helical" shall also be understood to include wound in a rectangle, printed, or in some other configuration, as FIG. 2 illustrates. The receiving coil 30 surrounds a central opening and defines a plane whose perpendicular plane runs parallel or nearly parallel to the longitudinal extension of the holding device 1. The portion H1 of the field lines that runs horizontal in FIG. 1 therefore crosses the receiving coil 30 and induces a voltage or current flow that may be used for supplying electrical energy to the end device affected. Such a current flow may be interpreted as a data signal in the same manner. The reverse flow of information is also possible: The receiving coil 30 may also be switched as a transmitting coil to transfer data from the end device to the transmitting coils switched as receiving coils. In doing so, so-called "load modulation" may be used in which the receiving coil represents a varying load, which may be detected on the transmitting coil.

For the end device 32, three individual transmitting coils 20 are interconnected by using joint activation to create a virtual larger coil in order to make a common magnetic field available for the end device 32. This may be used for instance for higher current consumption or to supply devices whose width exceeds the fit of the narrower end devices 31, 33.

The transmitting coil at the gap 35 is switched without current if no end device is disposed there. However, locations without a transmitting coil may also be provided, as for the end device 34, which does not have any active connection to the system or represents a reserve site. The system is not active here. Feed voltage, for instance, or even data information may be passed further along the holding device via a bridge placed in the carrier rail.

Figure 3:
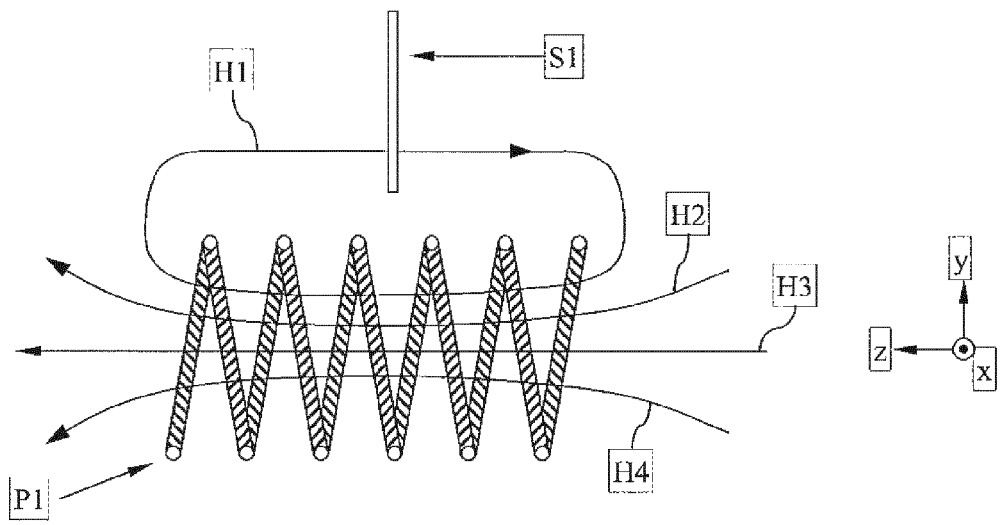
FIG. 3 is a longitudinal section through coils in FIG. 2.

The drawing in FIG. 2 depicts how the device having primary coil P1 and secondary coil 51 may be constructed for transferring energy inductively. The holding device 1 forms a top hat rail 10 to which the end devices may be clipped adjacent to one another in a row. The housings (not shown) for the end devices are embodied in a U shape at their attaching ends and engage around the transmitting coils 20 in order to keep the receiving coils 30 as close as possible to the associated transmitting coils 20. To this end the housings have clips (not shown). The housings for the end devices each accommodate at least one receiving coil 30. The ferrite structure 21 provided for shielding is arranged in the hollow space of the top hat rail 10. Attached to the ferrite structure 21 is the transmitting coil 20 that generates magnetic field lines H1, H2, H3, H4 (FIG. 3). The magnetic field lines H1, which are parallel to the holding device, cause energy to be added to the receiving coil 30. The energy is made available to an electronics unit 51 that may be attached to a circuit board 50.

From the drawing in FIG. 2 it may be clearly seen that the end devices may each clip to different locations along the rail 10 (which is depicted shortened for the purposes of the drawing). Thus the end devices may be positioned at any location along the rail 10.

Figure 4:
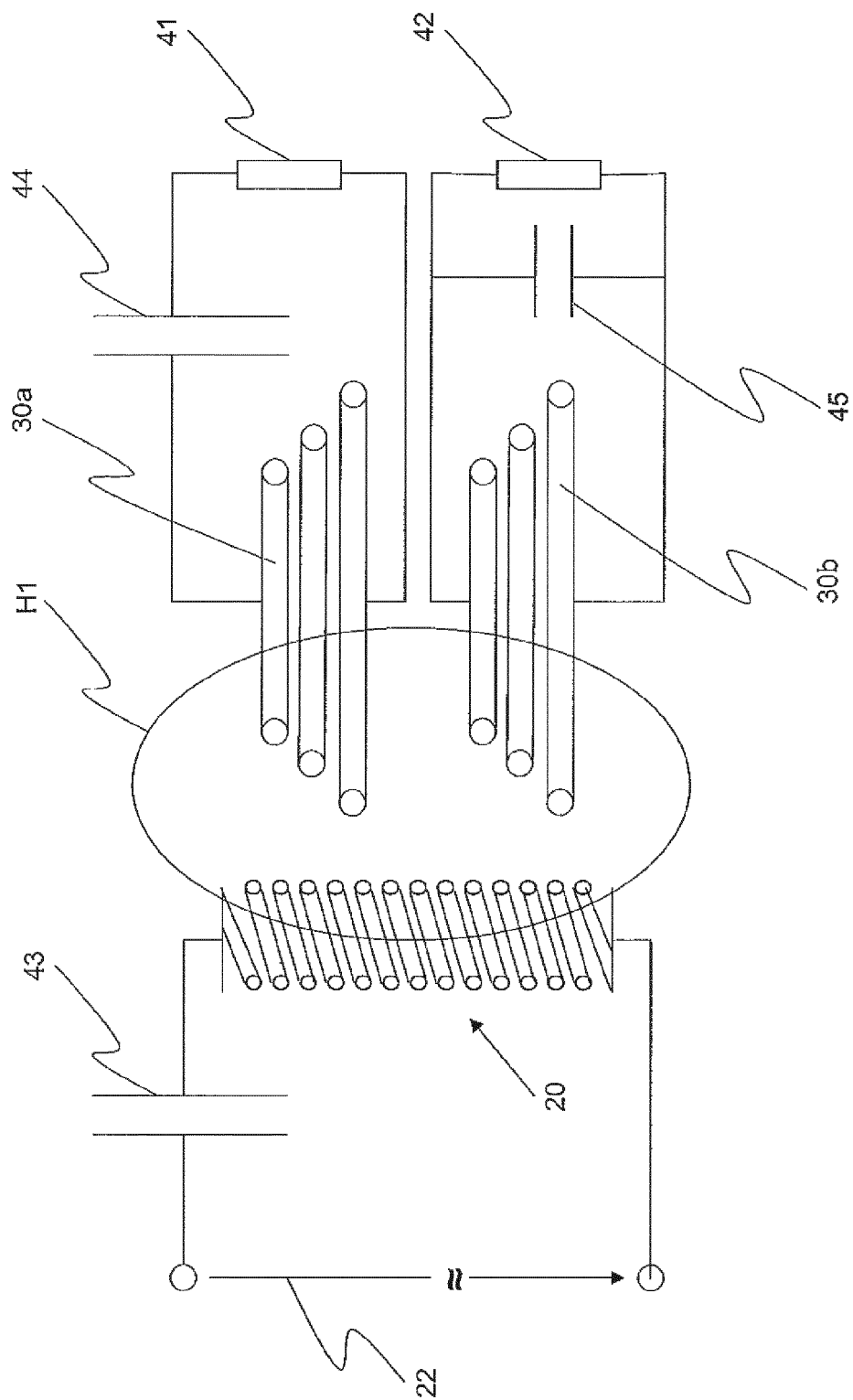
FIG. 4 is a diagram of resonant inductive energy transfer.

However, the ability of the receiving coil to be freely positioned has the drawback of weaker coupling between transmitting coil and receiving coil. Resonance effects between transmitting coil and receiving coil are used to attain better energy transfer. This is explained using FIG. 4. A transmitting coil 20 and two receiving coils 30a, 30b are arranged in an inductive coupling without using a magnetic core, which is indicated by a field line H1.

The transmitting coil 20 has a longer longitudinal extension than the receiving coils 30a, 30b, which are embodied as flat coils, so that a plurality of these flat coils may be arranged along the elongate transmitting coil 20. Power is supplied to the coil 20 via an alternating input voltage 22. The receiving coils 30a, 30b are each disposed in a separate module, each with a load 41, 42 that receives the energy output by the coil 20. Typically these loads each comprise a rectifier circuit, a smoothing capacitor, and an electronic circuit attached thereto.

The transfer of energy between the transmitting coil 20 and the receiving coils 30a, 30b is particularly efficient when the circuits including the respective coils are resonant at a suitable frequency of the input voltage. Each transmitting circuit with transmitting coil 20 and each receiving circuit with transmitting coil 30a or 30b has a resonance frequency that constitutes the inductances of the specific coils and the capacitances 43, 44, 45. The capacitances also include capacitive coupling effects between the coil windings. To match the resonances to one another, each of the circuits may have discrete capacitors that are arranged in a series or parallel to the respective coils. Combinations of series and parallel circuits are also possible to match the resonances. With the alignment of the resonance frequency to the working frequency of the alternating input voltage 22, the system may be operated at increased efficiency. In addition to the useful inductivity, which is indicated by the field line H1, there is stray inductance, symbolized by the field lines H2, H3, H4. The good efficiency may be explained in that the energy of the stray fields of the coils 20, 30a, 30b oscillates somewhat between the coil inductances and the capacitances 43, 44, 45 and is ideally not consumed. From the perspective of input voltage, the consumers 41 and 42 include almost only Ohmic portions.

To really be able to use the resonance effects, a regulating device (not shown) is allocated to each transmitting coil 20 and controls the current phase, current amplitude, and frequency of resonance with the coupled receiving coil 30.

What is claimed is:

1. A device for electrical energy supply and/or data supply of stationary end devices, that may transmit and/or receive data signals, using inductive coupling, comprising:
   an oblong holding device;
   a number of end devices that may have different widths in the direction of longitudinal extension of the holding device and occur as narrow or wide end devices;
   wherein the holding device permits the end devices to be held lined up adjacent to one another, even with gaps therebetween, and to this end includes a support rail that permits free positionability of the end devices at any location along the support rail;
   a number of adjacently arranged transmitting coils along the holding device, wherein at least some of the transmitting coils have a dimension in the longitudinal direction of the holding device that is approximately the same as the width of narrow end devices;
   the transmitting coils are embodied for generating magnetic field lines with a useable portion parallel to the longitudinal extension of the holding device and may be switched individually or to create groups, wherein interconnecting results in virtually longer coils having a common magnetic field in order to be able to handle wider end devices;
   at least some of the end devices each have at least one receiving coil that spans a plane transverse to the usable portion of the magnetic field lines of the transmitting coils;
   the end devices with their receiving coils may be geometrically allocated to the individual transmitting coils or to transmitting coils switched in groups, in that electromagnetic couplings are used only between predetermined transmitting coils and receiving coils for energy and/or data supply;
   wherein one or a plurality of the end devices is supplied with energy and/or data signals in a contactless manner by current application of individual transmitting coils or of interconnected transmitting coil groups.

2. The device in accordance with claim 1, wherein the windings of the transmitting coils are screw-like and each result in a helical coil having a coil axis parallel to the longitudinal extension of the support rail of the holding device.

3. The device in accordance with claim 1, wherein the windings of the at least one receiving coil run in a helix and surround an opening that has an axis parallel to the longitudinal extension of the support rail of the holding device.

4. The device in accordance with claim 1, wherein at least some of the transmitting coils are each provided with a ferrite structure that extends between the cover of the transmitting coil and the adjacent parts of the holding device for guiding and shielding the field lines.

5. The device in accordance with claim 1, wherein at least some of the receiving coils have a width measured in the longitudinal direction that is only a fraction of the width of each transmitting coil in order to attain relatively free arrangeability of narrow end devices along the support rail of the holding device.

6. The device in accordance with claim 1, wherein the support rail of the holding device also forms the support for the current and data signal lines of the transmitting coils.

7. The device in accordance with claim 1, wherein the arrangement of the transmitting coils has a gap along the holding device in order to accommodate an inactive device.

8. The device in accordance with claim 7, wherein the gap along the holding device is spanned by an inserted bridge in order to forward feed voltage and/or data signals along the holding device.

9. The device in accordance with claim 1, wherein transmitting coils and associated receiving coils are laid out or connected such that resonance occurs between coupled coils when there is a suitable excitation frequency.

10. The device in accordance with claim 1, wherein the transmitting coils are connected to sensors that detect coupling effects in order, when there is no coupling or a weak coupling between transmitting coil and receiving coil, to keep the affected transmitting coil out of operation.

11. The device in accordance with claim 1, wherein the holding device includes means provided on the end devices for latching the end device in question to the support rail.

* * * * *